(12) United States Patent
Shi et al.

(10) Patent No.: US 7,982,989 B1
(45) Date of Patent: Jul. 19, 2011

(54) METHOD AND SYSTEM FOR MEASURING MAGNETIC INTERFERENCE WIDTH

(75) Inventors: Changqing Shi, San Ramon, CA (US); Jimmy Wong, San Jose, CA (US); David D. Terrill, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 12/646,924

(22) Filed: Dec. 23, 2009

(51) Int. Cl.
*G11B 27/36* (2006.01)

(52) U.S. Cl. .......................... 360/31; 360/75; 360/77.02

(58) Field of Classification Search .................. None
See application file for complete search history.

(56) References Cited

U.S. PATENT DOCUMENTS

| | | | |
|---|---|---|---|
| 4,513,333 A * | 4/1985 | Young et al. | 360/77.02 |
| 4,516,165 A * | 5/1985 | Cunningham et al. | 360/53 |
| 5,600,500 A * | 2/1997 | Madsen et al. | 360/46 |
| 5,687,036 A | 11/1997 | Kassab | |
| 5,691,857 A * | 11/1997 | Fitzpatrick et al. | 360/77.06 |
| 5,812,337 A * | 9/1998 | Tanaka et al. | 360/73.12 |
| 6,028,731 A * | 2/2000 | Bond | 360/77.11 |
| 6,101,053 A | 8/2000 | Takahashi | |
| 6,252,731 B1 | 6/2001 | Sloan et al. | |
| 6,265,868 B1 | 7/2001 | Richter | |
| 6,445,521 B1 | 9/2002 | Schaff et al. | |
| 6,476,992 B1 * | 11/2002 | Shimatani | 360/46 |
| 6,525,892 B1 | 2/2003 | Dunbar et al. | |
| 6,680,609 B1 | 1/2004 | Fang et al. | |
| 6,791,775 B2 * | 9/2004 | Li et al. | 360/31 |
| 6,870,697 B2 | 3/2005 | Ikekame et al. | |
| 6,909,566 B1 * | 6/2005 | Zaitsu et al. | 360/31 |
| 6,914,738 B2 | 7/2005 | Fujiwara et al. | |
| 6,995,933 B1 | 2/2006 | Codilian et al. | |
| 7,095,577 B1 | 8/2006 | Codilian et al. | |
| 7,119,537 B2 * | 10/2006 | Che et al. | 324/210 |
| 7,203,023 B2 | 4/2007 | Kuroda et al. | |
| 7,529,050 B2 | 5/2009 | Shen et al. | |
| 7,567,397 B2 * | 7/2009 | Lu | 360/31 |
| 7,667,933 B2 * | 2/2010 | Kudo et al. | 360/313 |
| 7,706,096 B2 * | 4/2010 | Ito et al. | 360/75 |
| 7,729,071 B2 * | 6/2010 | Harada | 360/39 |
| 7,843,658 B2 * | 11/2010 | Kiyono | 360/31 |
| 2004/0010391 A1 | 1/2004 | Cheng-I Fang et al. | |
| 2004/0075931 A1 | 4/2004 | Kim et al. | |
| 2004/0080845 A1 * | 4/2004 | Yeo et al. | 360/31 |
| 2006/0098318 A1 * | 5/2006 | Feng | 360/31 |

* cited by examiner

*Primary Examiner* — Dismery E Mercedes

(57) ABSTRACT

A method for measuring a magnetic interference width for a magnetic recording head is described. The method includes writing a first track at a first frequency on a magnetic disk, writing a second track at the first frequency on the magnetic disk, and writing a third track at a second frequency on the magnetic disk between the first track and the second track. The third track partially overlaps both the first track and the second track and the second frequency is different from the first frequency. The method further includes measuring a readback profile across the first, second and third tracks on the magnetic disk.

21 Claims, 5 Drawing Sheets

__US 7,982,989 B1__

METHOD AND SYSTEM FOR MEASURING MAGNETIC INTERFERENCE WIDTH

FIELD

The present disclosure generally concerns magnetic recording heads and, more particularly, the measurement of the magnetic interference width of a magnetic recording head.

BACKGROUND

Hard disk drives utilize a magnetic recording head to read/write data from/to a spinning disk coated with a layer of magnetic material. The recording track width of the magnetic recording head is one of the factors that limits the density at which data can be stored on the disk. A smaller recording track width results in more tracks per inch (TPI) on the surface of the disk and correspondingly a higher data capacity. As magnetic recording heads decrease in size and the associated recording track widths decrease in size, the complexity of testing and evaluating magnetic recording heads increases.

A number of different measurements may be used to characterize the recording track width associated with a magnetic recording head. For example, the triple-track method uses a triple-track profile to measure a magnetic write width (MWW) using direct measurement of off-track readback signals. While the triple-track method is widely used, the measured MWW is typically narrower than the physical track footprint and therefore does not accurately reflect the final magnetic recording head performance in terms of the TPI in the hard drive. Furthermore, the measured MWW is sensitive to transition edges and curvature as well as reader resolution and off-track response. Accordingly, the MWW obtained using the triple-track method is not a preferred targeting and controlling parameter.

Another commonly used measurement is the erase-profile based magnetic track width (MTW) or magnetic erase width (MEW). This measurement involves the direct measurement of magnetic erasure. In particular, this measurement measures the recording field bubble footprint width and therefore has good correlation with the final TPI of the hard drive. However, the process of making this measurement requires a relatively long testing time and is sensitive to testing noise and/or mechanical/servo instability. Accordingly, this measurement is not suitable for high volume manufacturing.

SUMMARY

The subject technology provides a fast and accurate measurement technique for magnetic recording heads that is suitable for high volume manufacturing environments. The measurement technique involves three writes to a disk and a single readback process to obtain an interference profile. For example, a magnetic interference width (MIW) may be measured from the interference profile of a recording track written over background tracks with a frequency offset.

According to one aspect of the present disclosure, a method for measuring a magnetic interference width for a magnetic recording head is described. The method includes writing a first track at a first frequency on a magnetic disk, writing a second track at the first frequency on the magnetic disk, and writing a third track at a second frequency on the magnetic disk between the first track and the second track. The third track partially overlaps both the first track and the second track and the second frequency is different from the first frequency. The method further includes measuring a readback profile across the first, second and third tracks on the magnetic disk.

According to another aspect of the present disclosure, a computer-readable medium encoded with executable instructions for measuring a magnetic interference width for a magnetic recording head is described. The executable instructions include code for writing a first track at a first frequency on a magnetic disk, writing a second track at the first frequency on the magnetic disk, and writing a third track at a second frequency on the magnetic disk between the first track and the second track. The third track partially overlaps both the first track and the second track and the second frequency is different from the first frequency. The executable instructions further include code for measuring a readback profile across the first, second and third tracks on the magnetic disk.

According to another aspect of the present disclosure, a test system for measuring a magnetic interference width for a magnetic recording head is described. The test system includes a memory encoded with executable instructions and a processor configured to execute the instructions encoded on the memory to write a first track at a first frequency on a magnetic disk, to write a second track at the first frequency on the magnetic disk, and to write a third track at a second frequency on the magnetic disk between the first track and the second track. The processor is further configured to execute the instructions encoded on the memory to measure a readback profile across the first, second and third tracks on the magnetic disk. The third track partially overlaps both the first track and the second track and the second frequency is different from the first frequency.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

Figure 1:
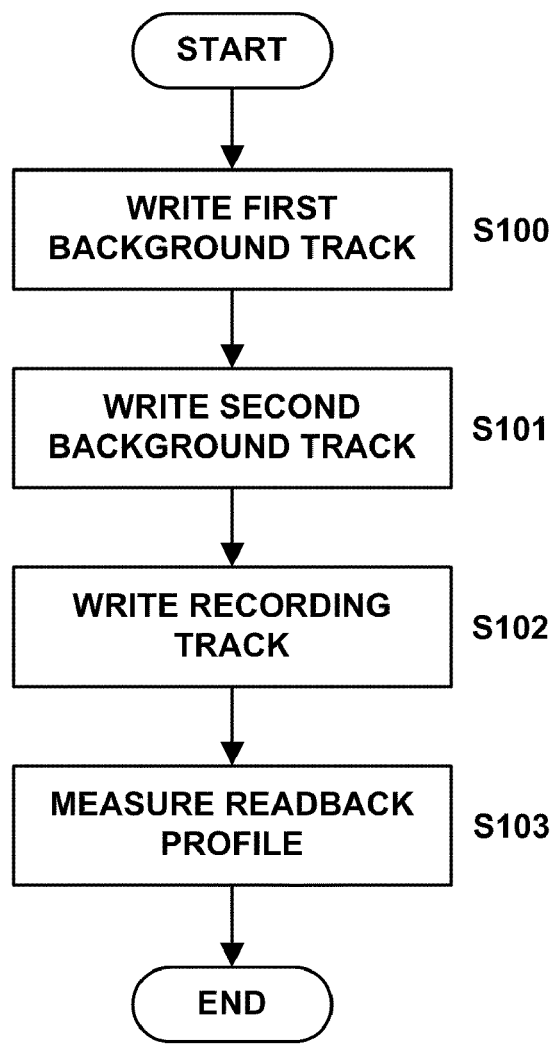
FIG. 1 is a flowchart illustrating steps of a method for measuring a magnetic interference width of a magnetic recording head according to one aspect of the subject technology.

FIG. 1 is a flowchart illustrating steps of a method for measuring a magnetic interference width of a magnetic recording head according to one aspect of the subject technology. Briefly, the method includes writing first and second background tracks at a first frequency (steps S100 and S101), writing a recording track at a second frequency different from the first frequency (step S102), where the recording track partially overlaps both the first and second background tracks, and measuring an interference readback profile across the first and second background tracks and the recording track (step S103). Each of the steps represented in FIG. 1 are described in further detail below.

Figure 2B:
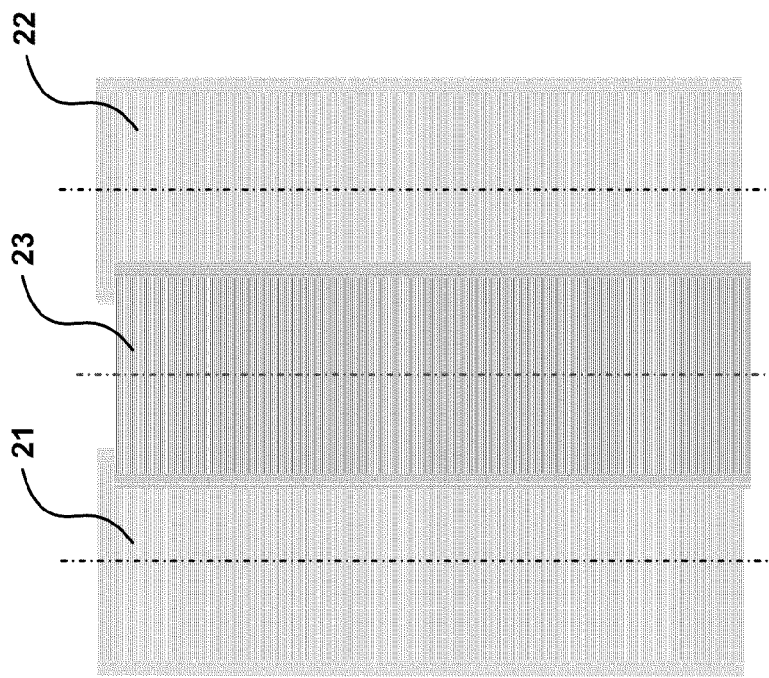
FIGS. 2A and 2B are representations of two adjacent background tracks partially overwritten by a recording track according to one aspect of the subject technology.
Figure 2A:
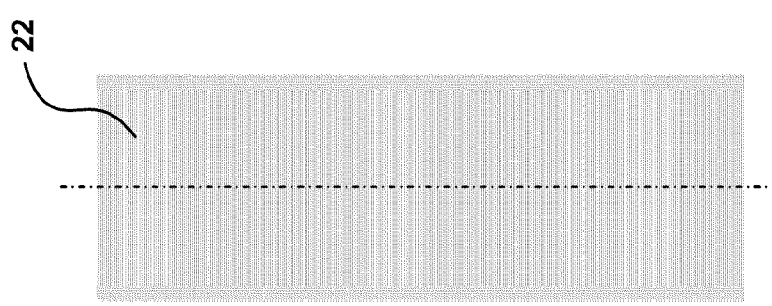
Figure 2A:
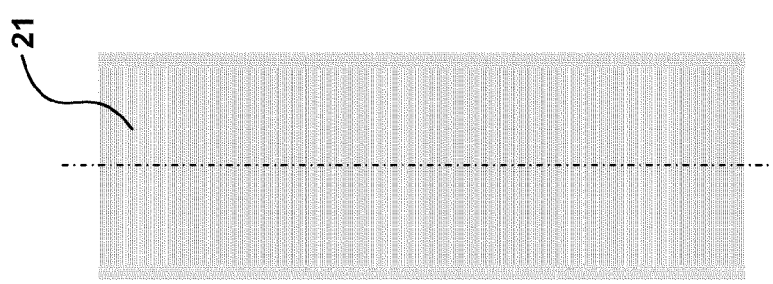

Tracks may be thought of as concentric circles arranged on the surface of the disk that are magnetically encoded with a signal by a magnetic recording head. In step S100, a first background track is written to a disk using the magnetic recording head. In step S101 a second background track is written to the disk adjacent to the first background track using the magnetic recording head. A segment of first background track 21 and a segment of second background track 22 are illustrated in FIG. 2A.

In step S102, a recording track is written to the disk using the magnetic recording head. The recording track is written to partially overlap both the first background track and the second background track. According to one aspect of the subject disclosure, the first background track is space apart from the second background track such that the recording track overlaps approximately 30% of the first background track and approximately 30% of the second background track. The subject technology is not limited to this spacing and overlapping. For example, the first and second background tracks may be spaced apart such that the recording track overlaps between 10% and 50% of the first background track and between 10% and 50% of the second background track. It is noted that the overlap of the first background track and the recording track may be different from the overlap of the second background track and the recording track. FIG. 2B illustrates the segment of first background track 21 and the segment of second background track 22 partially overlapped by a segment of recording track 23.

Figure 3:
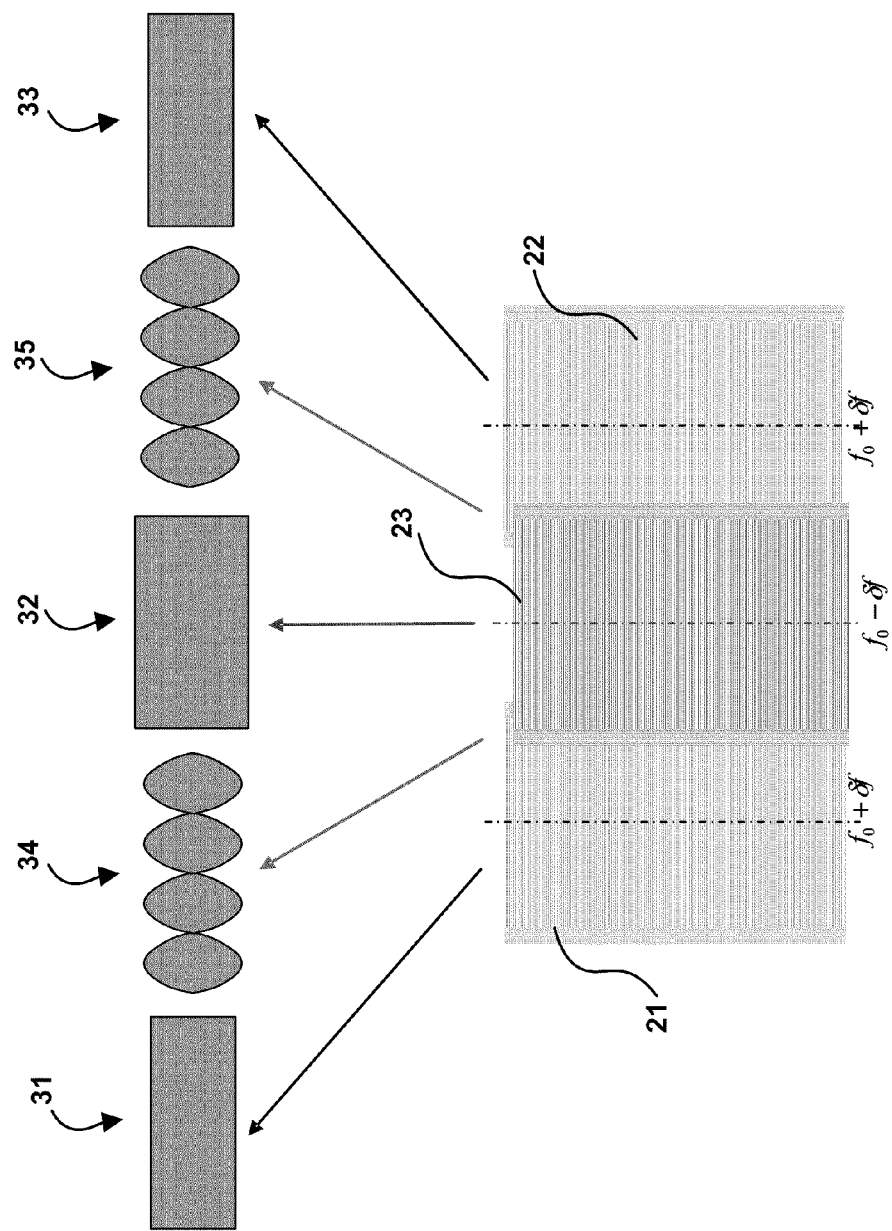
FIG. 3 is a diagram illustrating interference between signals written in the overlapped regions of background tracks and a recording track according to one aspect of the subject technology.

As noted above, the first background track and the second background track are written at a frequency different from the frequency used for the recording track. The different frequencies cause the first and second background tracks to interfere with the recording track in and around the regions of overlap between the tracks during the measurement of a readback profile. The interference between the tracks is illustrated in FIG. 3 according to one aspect of the subject technology. Blocks 31, 32 and 33 represent the amplitudes of a readback signal as a magnetic reader is scanned across first background track 21, recording track 23 and second background track 22, respectively, outside of the overlap regions of the tracks. Sinusoidal blocks 34 and 35 represent the amplitudes of the readback signal as the magnetic reader is scanned across the overlapped regions of first background track 21 and recording track 23 and the overlapped regions of recording track 23 and second background track 22, respectively. Unlike the amplitudes of blocks 31, 32 and 33, which remain relatively steady, the amplitudes of sinusoidal blocks 34 and 35 vary due to interference between the first frequency used to write first background track 21 and second background track 22 and the second frequency used to write recording track 23.

Figure 4:
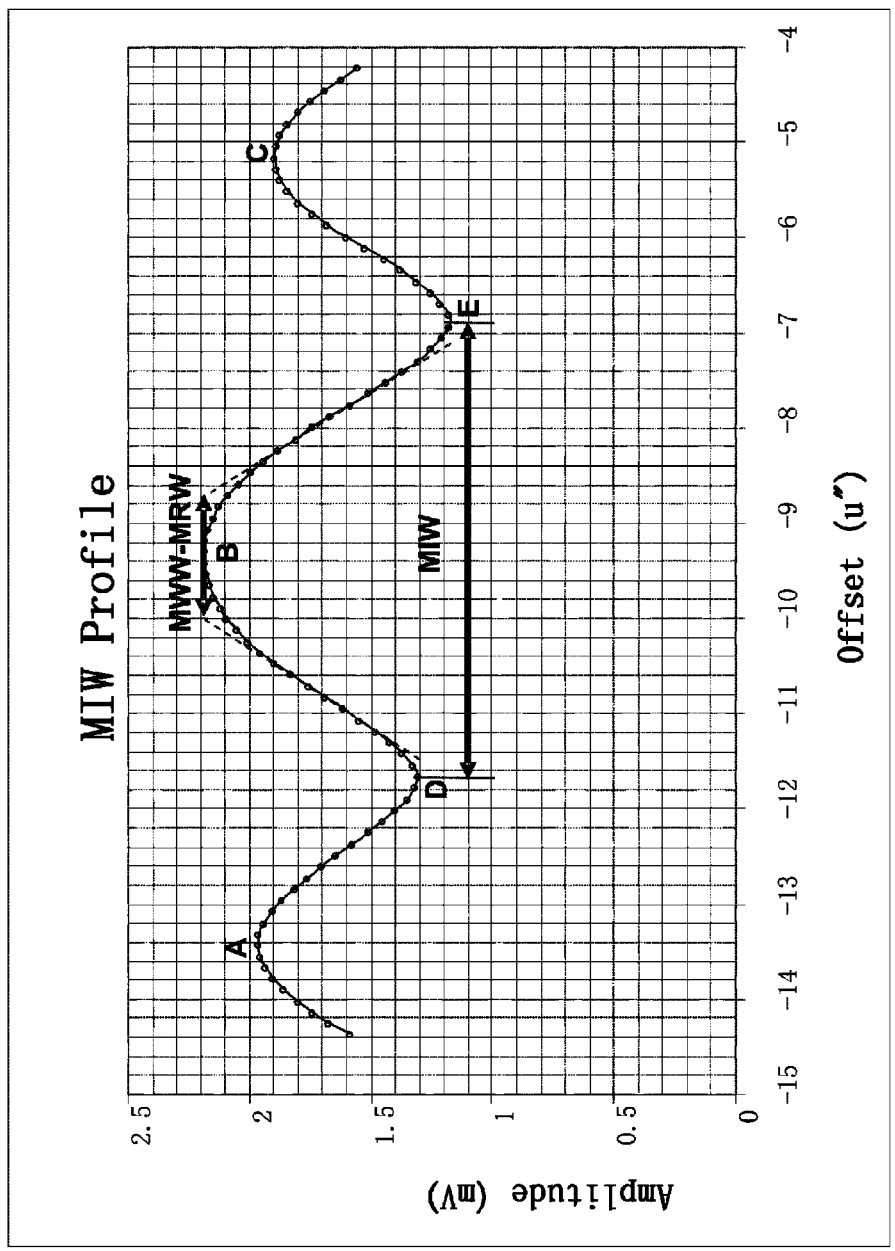
FIG. 4 is a graph depicting a magnetic interference width readback profile according to one aspect of the subject technology.

Returning to FIG. 1, a readback profile across the first background track, the recording track and the second background track is measured in step S103. The readback profile represents the average amplitudes of a readback signal through respective revolutions of the disk as a magnetic reader is positioned across the first background track, the recording track and the second background track. FIG. 4 is a graph showing one example of a magnetic interference width readback profile according to one aspect of the technology. The x-axis represents the offset positioning of the magnetic reader as it is scanned across the tracks. The y-axis represents the average amplitude of the readback signal through one revolution at each respective offset position of the magnetic reader.

The readback profile depicted in the graph of FIG. 4 includes three maxima A, B and C and two minima D and E. The maxima represent portions of the tracks where interference of readback signals of two adjacent tracks is minimized or non-existent and the minima represent portions of the tracks where interference of readback signals of two adjacent tracks is maximized. Minimum D corresponds to the offset position of the magnetic reader where the center of the magnetic reader is aligned with the center of the erase band between the first background track and the recording track. Minimum E corresponds to the offset position of the magnetic reader where the center of the magnetic reader is aligned with the center of the erase band between the second background track and the recording track. The distance between the offset position of the magnetic reader at minimum D and the offset position of the magnetic reader at minimum E is the magnetic interference width (MIW) associated with the magnetic recording head, which consists of the magnetic write width (MWW) and one-half of the erase band width of the magnetic recording head. Also shown in FIG. 4 is the magnetic write width (MWW) less the magnetic read width (MRW), which may be determined by line-fitting the curve connecting minimum D and maximum B and the curve connecting maximum B and minimum E and determining the distance between the offset positions of the magnetic reader where the fitted lines reach the amplitude of maximum B.

According to one aspect of the subject technology, the first frequency used for the first and second background tracks is a center frequency plus a frequency offset and the second frequency used for the recording track is the center frequency less the frequency offset. Those skilled in the art will recognize that the first frequency may be the center frequency less the frequency offset and the second frequency may be the center frequency plus the frequency offset in an alternative arrangement. The amount of interference between tracks increases as the frequency offset increases. Maximizing the frequency offset, and correspondingly the interference, emphasizes the maxima and minima in the readback profile. It is noted, however, that the frequency offset is limited by the bandwidth of the analog band-pass filter through which the readback signal is read. If the frequency offset is too large, the first and second frequencies may go beyond the usable bandwidth of the filter.

According to one aspect of the subject technology, the frequency offset is selected such that the bandwidth of the analog band-pass filter is a factor of two to ten times the frequency offset. For example, the bandwidth of the analog band-pass filter may be between 20 kHz and 2 MHz and the frequency offset may be between 10 kHz and 1000 kHz with a center frequency of between 10 MHz and 1 GHz.

Figure 5:
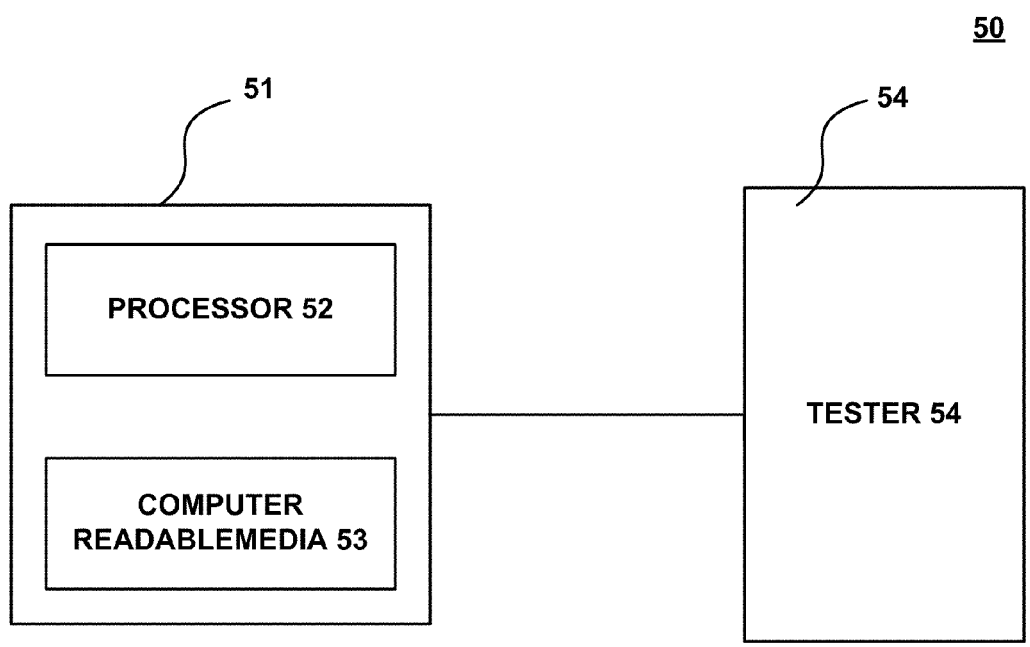
FIG. 5 is a block diagram depicting components of a test system according to one aspect of the subject technology.

FIG. 5 is a block diagram of a test system according to one aspect of the subject technology. As represented in FIG. 5, test system 50 includes test controller 51, containing processor 52 and computer-readable media 53, and tester 54. Test controller 51 is coupled to tester 54 to communicate control signals and data between tester 54 and test controller 51. Test controller 51 may be coupled to tester 54 using any standard interface known to those skilled in the art. Alternatively, test controller 51 may be coupled to tester 54 using one or more proprietary interfaces designed for test controller 51 and/or tester 54.

Processor 52 is coupled to computer readable media 53 via one or more data and control buses (not shown). Processor 52 is configured to execute one or more sequences of instructions encoded on computer readable media 53 to perform the method for measuring a magnetic interference width described above. Processor 52 is further configured to process and store data received back from tester 54, such as readback data used to generate the readback profile shown in FIG. 4, in computer readable media 53. Processor 52 is further configured to execute one or more sequences of instructions to analyze the readback profile to determine the magnetic interference width and other parameters discussed above. Computer readable media 53 represents one or more of magnetic media (e.g., hard disk drive, floppy disk drive, tape drive, etc.), optical media (e.g., CD-ROM, DVD, etc.) and electronic media (e.g., flash memory, random access memory, etc.).

Tester 54 represents equipment configured to mount a disk and a magnetic recording head. Tester 54 is further configured to spin the disk and position the magnetic recording head over the spinning disk to read and write tracks on the disk. The rotation of the disk and the positioning of the magnetic recording head may be performed by tester 54 based on control signals received from test controller 51. Alternatively, tester 54 may control the rotation of the disk and the positioning of the magnetic recording head using an internal controller. For example, tester 54 may be a spin stand.

The magnetic interference width discussed above provides significant advantages over many conventional parameters used to test and evaluate magnetic recording heads. For example, the magnetic interference width has good correlation to the track per inch (TPI) metric of the magnetic recording head. The magnetic interference width measurement has good measurement signal-to-noise ratio and strong amplitude over any head/test noise. The magnetic interference width can be obtained in a relatively short period of time, making it suitable for high volume manufacturing. Finally, the magnetic interference width is relatively insensitive to servo/mechanical instability in the tester.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for measuring a magnetic interference width for a magnetic recording head, the method comprising:
    writing a first track at a first frequency on a magnetic disk;
    writing a second track at the first frequency on the magnetic disk;
    writing a third track at a second frequency on the magnetic disk between the first track and the second track, wherein the third track partially overlaps both the first track and the second track and wherein the second frequency is different from the first frequency;
    measuring a readback profile across the first, second and third tracks on the magnetic disk;
    determining a minima of the readback profile across the first, second and third tracks on the magnetic disk; and
    determining a distance between the minima of the readback profile.

2. The method according to claim 1, wherein the magnetic interference width comprises the distance between the minima of the readback profile.

3. The method according to claim 2, wherein the first frequency is a base frequency plus an offset and the second frequency is the base frequency less the offset.

4. The method according to claim 3, wherein the base frequency is between 10 MHz and 1 GHz.

5. The method according to claim 4, wherein the offset is between 10 kHz and 1000 kHz.

6. The method according to claim 2, wherein between 10% and 50% of the third track overlaps the first track and between 10% and 50% of the third track overlaps the second track.

7. The method according to claim 6, wherein 30% of the third track overlaps the first track and 30% of the third track overlaps the second track.

8. A non-transitory computer-readable medium encoded with executable instructions for measuring a magnetic interference width for a magnetic recording head, the executable instructions comprising code for:
  writing a first track at a first frequency on a magnetic disk;
  writing a second track at the first frequency on the magnetic disk;
  writing a third track at a second frequency on the magnetic disk between the first track and the second track, wherein the third track partially overlaps both the first track and the second track and wherein the second frequency is different from the first frequency;
  measuring a readback profile across the first, second and third tracks on the magnetic disk;
  determining a minima of the readback profile across the first, second and third tracks on the magnetic disk; and
  determining a distance between the minima of the readback profile.

9. The computer-readable medium according to claim 8, wherein the magnetic interference width comprises the distance between the minima of the readback profile.

10. The computer-readable medium according to claim 9, wherein the first frequency is a base frequency plus an offset and the second frequency is the base frequency less the offset.

11. The computer-readable medium according to claim 10, wherein the base frequency is between 10 MHz and 1 GHz.

12. The computer-readable medium according to claim 11, wherein the offset is between 10 kHz and 1000 kHz.

13. The computer-readable medium according to claim 9, wherein between 10% and 50% of the third track overlaps the first track and between 10% and 50% of the third track overlaps the second track.

14. The computer-readable medium according to claim 13, wherein 30% of the third track overlaps the first track and 30% of the third track overlaps the second track.

15. A test system for measuring a magnetic interference width for a magnetic recording head, the test system comprising:
  a memory encoded with executable instructions; and
  a processor configured to execute the instructions encoded on the memory to write a first track at a first frequency on a magnetic disk, to write a second track at the first frequency on the magnetic disk, to write a third track at a second frequency on the magnetic disk between the first track and the second track, to measure a readback profile across the first, second and third tracks on the magnetic disk, to determine a minima of the readback profile across the first, second and third tracks on the magnetic disk, and to determine a distance between the minima of the readback profile,
  wherein the third track partially overlaps both the first track and the second track and wherein the second frequency is different from the first frequency.

16. The test system according to claim 15, wherein the magnetic interference width comprises the distance between the minima of the readback profile.

17. The test system according to claim 16, wherein the first frequency is a base frequency plus an offset and the second frequency is the base frequency less the offset.

18. The test system according to claim 17, wherein the base frequency is between 10 MHz and 1 GHz.

19. The test system according to claim 18, wherein the offset is between 10 kHz and 1000 kHz.

20. The test system according to claim 16, wherein between 10% and 50% of the third track overlaps the first track and between 10% and 50% of the third track overlaps the second track.

21. The test system according to claim 20, wherein 30% of the third track overlaps the first track and 30% of the third track overlaps the second track.

* * * * *